United States Patent [19]

Caray

[11] Patent Number: 4,545,472
[45] Date of Patent: Oct. 8, 1985

[54] CLUTCH RELEASE BEARING
[75] Inventor: André Caray, Valence, France
[73] Assignee: Valeo, Paris, France
[21] Appl. No.: 515,490
[22] Filed: Jul. 20, 1983
[30] Foreign Application Priority Data
   Jul. 20, 1982 [FR] France ............... 82 12629
[51] Int. Cl.[4] .......................... F16D 23/12
[52] U.S. Cl. .......................... 192/98; 192/99 A
[58] Field of Search ............. 192/98, 99 R, 99 A
[56] References Cited
   U.S. PATENT DOCUMENTS
   3,640,364  2/1972  Utton ..................... 192/98
   FOREIGN PATENT DOCUMENTS
   1228504  4/1971  United Kingdom ........ 192/98

Primary Examiner—Stephen F. Husar
Attorney, Agent, or Firm—Charles E. Brown; Charles A. Brown

[57] ABSTRACT

A clutch release bearing suitable for an automotive vehicle comprises a drive member adapted to operate a clutch release device in a clutch and an operating member adapted to be operated by a control member, coupled together in the axial direction but free to rotate relative to one another. The operating member comprises at least one radial arm and axial and radial supports for the control member. These supports are respectively constituted by a pad attached to the arm by a peg and a tangential flange of a plate. The plate further comprises a transverse flange perpendicular to the tangential flange and adapted to be clamped between the pad and the arm. It has a hole in it through which the peg can pass.

15 Claims, 18 Drawing Figures

CLUTCH RELEASE BEARING

BACKGROUND OF THE INVENTION

1. Field of the Invention

The present invention is generally concerned with clutch release bearings in which a drive member which is adapted to operate a clutch release device in a clutch, for example a diaphragm spring, and an operating member which is adapted to be operated by a control member, in practice a clutch release yoke, are coupled together in the axial direction but free to rotate relative to one another. The invention is more particularly concerned with clutch release bearings of the aforementioned type in which the operating member comprises at least one arm projecting radially from a body portion, said arm and said body portion respectively having an axial support surface and a radial support surface for said control member.

2. Description of the Prior Art

An axial support surface of this kind is usually constituted by a pad coupled axially to the radial arm of the operating member by a peg, said peg being in practice force-fitted into a hole in said arm provided for this purpose and parallel to the axis of the bearing. The radial support surface is generally obtained by milling an axial or tangential facet into said initially cylindrical body portion, at the base of the radial arm; this facet is then surface-hardened so that it is able, efficiently and without excessive wear, to guide the control member in the axial direction and to block rotation of the operating member by means of the control member. In practice, with a view to optimizing the contact area between the control member and the pad relative to the radial dimension of the latter, said pad is often machined to form a flat which is adapted to cooperate with the aforementioned facet. Thus in this type of bearing the formation of the axial and radial support surfaces involves the execution of milling operations which are significantly more costly than the turning operations which are all that is required to produce the bearings from the original castings.

In another arrangement disclosed in French Patent Application No. 81 17754, the axial and radial support surfaces are constituted by the central leg and a flange of a T-shaped part, the other flange having a hole by means of which said T-shaped part is force-fitted to the radial arm so that it is in contact with the cylindrical body portion. This arrangement eliminates all milling operations and all surface treatment of the operating member. On the other hand, it has a number of disadvantages. Specifically, it results in a non-negligible axial dimension on the side of the radial arm opposite that on which said central leg rests. Also, retained on the radial arm by virtue of its force-fitting thereto, the T-shaped part in practice bears on the body of the operating member, as a a result of which the latter is subject to wear. Further, the aforementioned force-fitting involves extremely accurate dimensioning of said hole and the radial arm.

The objective of the present invention is to overcome the disadvantages of the aforementioned prior art arrangements.

SUMMARY OF THE INVENTION

The invention consists in a clutch release bearing which comprises a drive member which is adapted to operate a clutch release device in a clutch, an operating member which is adapted to be operated by a control member, a radial arm on said operating member, a transverse shoulder on said radial arm, a pad on said radial arm which is adapted to constitute an axial support for said control member, a peg adapted to couple said pad to said arm in the axial direction, a plate, a tangential flange on said plate which is adapted to constitute a radial support for said control member, a transverse flange on said plate which is perpendicular to said tangential flange and which is disposed between and adapted to be clamped between said pad and said transverse shoulder on said arm, and a hole in said tangential flange which is adapted to permit said peg to pass through it, wherein said drive member and said operating member are coupled together in the axial direction but free to rotate relative to one another.

Thus the invention eliminates all milling of the operating member and the method of mounting the pad and the plate on the radial arm eliminates all play between these parts and so eliminates direct wear of the operating member.

The aforementioned hole is preferably open-ended radially outward of said transverse flange, which facilitates the offering up of the pad and peg for positioning in the plate.

In some embodiments, the invention comprises a plate which comprises, in addition to the aforementioned transverse and tangential flanges, an external flange which is axially oriented in the opposite sense to said tangential flange and which is joined to said transverse flange at the edge of the latter opposite the edge at which it is joined to said tangential flange. Depending on the extent to which this external flange is curved, said plate is in contact with the peripheral surface of the radial arm along one or two lines or over a surface. The effect of this external flange is to increase the area of contact between the radial arm and said plate and to improve the immobilization of the latter.

In accordance with one important characteristic of the invention, the plate comprises a slot at the junction of the tangential and transverse flanges, the essential function of which is to permit the passage of a pad through the radial support surface. In certain cases, this slot contributes to the immobilization of the plate.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figure 1:
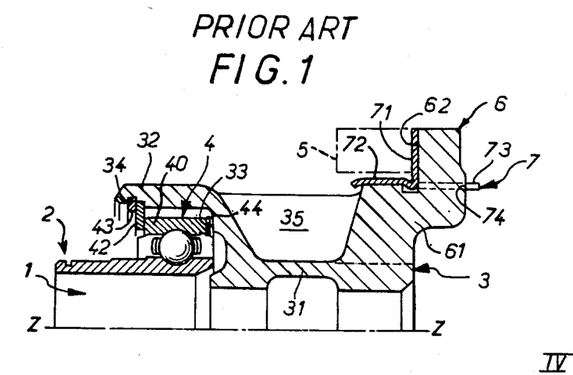
FIG. 1 is a half-view in axial cross-section through a clutch release bearing of a type known per se.
Figure 2:
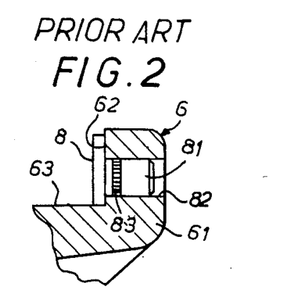
FIG. 2 is a view in axial cross-section of a radial arm of another type of clutch release bearing known per se.

The previously mentioned two types of known arrangement, whereby a clutch release bearing radial arm may be provided with radial and axial support surfaces for a control member such as a clutch release yoke, are illustrated in FIGS. 1 and 2.

In the known manner, a clutch release bearing 1 comprises a drive member 2 and an operating member 3 mounted rotatably relative to one another while being coupled together in the axial direction by means of a ball bearing 4.

The drive member is adapted to act on the clutch release device in a clutch, not shown, such as a diaphragm spring. In the embodiment shown, the clutch release bearing 1 is adapted to operate in traction, an arrangement which is well-known per se and which, not forming part of the present invention, will not be shown or described here in further detail.

In this embodiment, the operating member 3 comprises a sleeve 31 by virtue of which it is slidably engaged on a guide member (not shown). At one of its axial ends, sleeve 31 terminates in an outwardly flared ring 32 within which is housed ball bearing 4. The inner ring of ball bearing 4 forms part of drive member 2 while its outer ring 40 is gripped between a transverse shoulder 33 of member 10 and a washer 42 bearing on a split ring 43 disposed in a groove 34 formed internally for this purpose in ring 32. The clutch release bearing shown in FIG. 1 is of the self-centering type with the self-centering action maintained by virtue on the one hand of radial clearance between outer ring 40 and ring 32 and on the other hand by axially acting axial elastic means, in this instance in the form of a corrugated washer 44 of the type marketed under the trade name "ONDUFLEX". Note that in this instance outer ring 40 of ball bearing 4 does not bear directly on transverse shoulder 33, but rather through the intermediary of said axially acting elastic means. In a variant, the outer ring is disposed between shoulder 33 and the elastic means, which then bear on washer 42.

At its axial end opposite ring 32, operating member 3 comprises, to provide axial and radial support for a control member, in practice a clutch release yoke, one finger 5 of which is shown in chain-dotted line, a radial arm 6 which is generally coupled to a second radial arm diametrically opposite the first.

In the embodiment shown, the arms 6 extend cantilever fashion from tabs 61 linked to ring 32 by axial ribs 35.

To each of arms 6 is transversely attached a T-shaped part 7 having a central leg 71 forming an axial support surface, a solid flange 72 forming a radial support surface, and a hollowed out flange 73 comprising an opening 74 into which radial arm 6 is force-fitted. Leg 71 is supported on a transverse shoulder 62 of the arm while solid flange 72 is supported on the cylindrical surface of tab 61.

FIG. 2 shows the second type of arrangement as mentioned hereinabove, in which a radial arm 6 carried by a tab 61 is provided with a pad 8 attached to it in the axial direction by means of a peg 81 integral with it. An axial hole 82 is provided for this purpose in radial arm 6, into which the peg, which is generally provided with splines 83, is force-fitted. Pad 8 forms an axial support surface while the radial support surface is formed by a tangential facet 63 obtained by milling the cylindrical surface of tab 61.

With reference to FIGS. 3 to 14, in a clutch release bearing in accordance with the invention the radial and axial support surfaces are constituted by two distinct and separate parts: a pad 8 of the aforementioned kind forming the axial support surface and plate 9, 19 comprising an axial or tangential flange 91, 191 forming the radial support surface and a radial or transverse flange 92, 192 adapted to be disposed between and clamped between said pad and shoulder 62 on radial arm 6.

Figure 3:
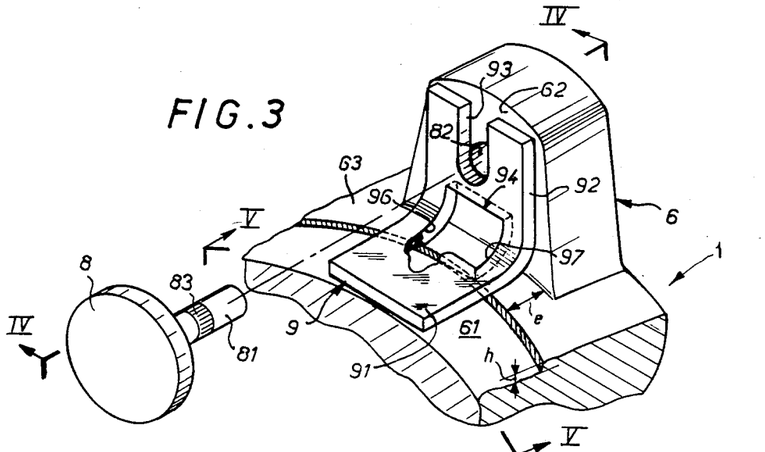
FIG. 3 is a partially exploded view in perspective of a radial arm of a clutch release bearing in accordance with the present invention.
Figure 4:
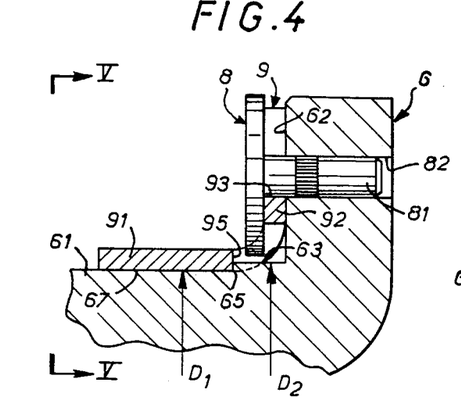
FIG. 4 is an axial cross-section through the aforementioned radial arm on the lines IV—IV in FIGS. 3 and 5.
Figure 5:
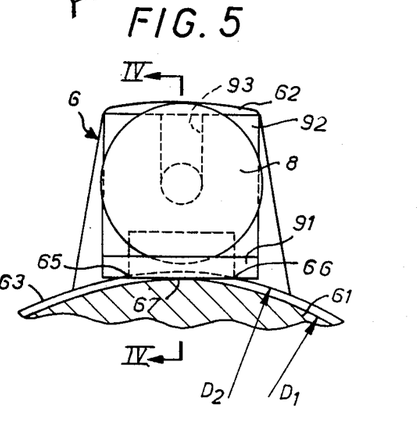
FIG. 5 is a radial cross-section through the aforementioned radial arm on the lines V—V in FIGS. 3 and 4.

In FIGS. 3 to 5, transverse flange 92 has a hole 93 adapted to permit the peg 81 to pass through it; this hole is open-ended radially outward of the bearing so as to facilitate the fitting of said peg 81 and the pad in the manner to be described hereinbelow. In practice, the peg and the pad are parts of a single component.

Within the bent portion of plate 9, at the junction of tangential flange 91 and transverse flange 92, is formed an oblong slot 94 into which pad 8 extends. Thus for a given radial dimension and for a given hole 82, slot 94 permits the use of pads 8 of large diameter without the need for forming a flat on same.

FIG. 3 is a partially exploded view in perspective. Plate 9 is positioned against arm 6 and the operating member while pad 8 and its peg are shown at some remove. In practice, the fitting of the pad and the plate against the arm and the operating member comprises a first phase in which peg 81 is introduced axially into hole 93 in plate 9 until pad 8 comes into contact with flange 92; they are then slid relative to one another in the radial direction so as to bring the body of the peg against the bottom of hole 93, whereby the pad is engaged in slot 94. A second phase consists in offering up the plate-pad assembly to hole 82 for engagement of peg 81 therein. Note that after fitting, peg 81 cooperates with the bottom of hole 93 along at least one line of contact. The peg thus forms a radial abutment for the plate, thereby retaining it in the radial direction.

In the embodiment of a clutch release bearing in accordance with the invention illustrated in FIGS. 3 to 5, tab 61 constitutes a cylindrical body portion of diameter $D_1$ and carries, at the base of transverse shoulder 62, a cylindrical stepped portion 63 of height h and width e, the cylindrical surface of which has a diameter $D_2$ which is equal to $D_1 + 2h$. With reference to FIG. 4, slot 94 has, in tangential flange 91, a transverse edge 95 facing stepped portion 63. As seen in FIG. 5, said stepped portion 63 is also in contact with axial edges 96 and 97 of slot 94, with at least two points of contact 65 and 66. For greater widths e of stepped portion 63, these contact points become line segments.

Note also that tangential flange 91 and body portion 61 in that part of diameter $D_1$ permit contact along a generatrix 67, which minimizes deformation caused by the control member.

Note that, after fitting of the pad-plate assembly to the operating member, transverse flange 92 of the plate is clamped between shoulder 62 and pad 8, whereby the plate is immobilized in the axial direction relative to the operating member. The plate is also locked against rotation relative to the latter by virtue of contact points 65 and 66 between stepped portion 63 and axial edges 96, 97 of slot 94, when peg 81 is in contact with the bottom of hole 93 in the plate. Note that slot 94 has two functions, namely contributing to preventing rotation of plate 9 and permitting radial insertion of pad 8 into tangential flange 91 in the direction towards stepped portion 63, in practice up to the limit of actual contact.

The implementation of a clutch release bearing as shown in FIGS. 3 to 5 is in practice a highly delicate matter in view of the large number of contact areas defined in it, the formation of which calls for tolerances in respect of the bearing and plate 9 which would be difficult to achieve in the context of large-scale mass production. Specifically, the simultaneous surface contact of the pad against transverse flange 92 (or against shoulder 62) and transverse edge 95 against stepped portion 63 requires very tight manufacturing tolerances in respect of the dimensions of said transverse edge 95. It may prove advantageous in practice to dispense with the latter contact surface with the stepped portion and to form transverse edge 95 at a distance from the pad-plate contact surface which is greater than e. Moreover, the simultaneity of contacts at 65, 66 and 67 also requires very strict tolerances in respect of the axial edges 96 and 97 of the slot, which is cut out from a bend area. In practice it may be advantageous to dispense with either contact line 67 or contact points 65 and 66. It is nevertheless possible in certain cases to realize virtually all of these contact areas by manufacturing plate 9 from a portion of flat sheet which is slightly elastic and which is then bent to an angle slightly less than a right angle. In this way, on force-fitting of peg 81 into hole 82, the clamping of transverse flange 92 of plate 9 against pad 8 and transverse shoulder 62 tends to flatten tangential flange 91 against tab 61 while drawing it in the direction of arm 6, resulting in very close contact between pad 8, plate 9 and arm 6. Note that in this case the elasticity of the plate tends to urge the bottom of pole 93 in the plate radially against the peg, which further reinforces the plate-arm contact.

FIGS. 6 to 11 illustrate various embodiments of a clutch release bearing in accordance with the invention in which the radial and axial support surfaces for a control member consist on the one hand of a pad 8 as previously and on the other hand of a plate 19 comprising, in addition to a tangential flange 191 and a transverse flange 192 comparable with flanges 91 and 92 as previously described, an external flange 190 which is axially oriented in the opposite sense to tangential flange 191 and which is joined to transverse flange 192 at the edge of the latter opposite the edge at which it is joined to the tangential flange.

Figure 6:
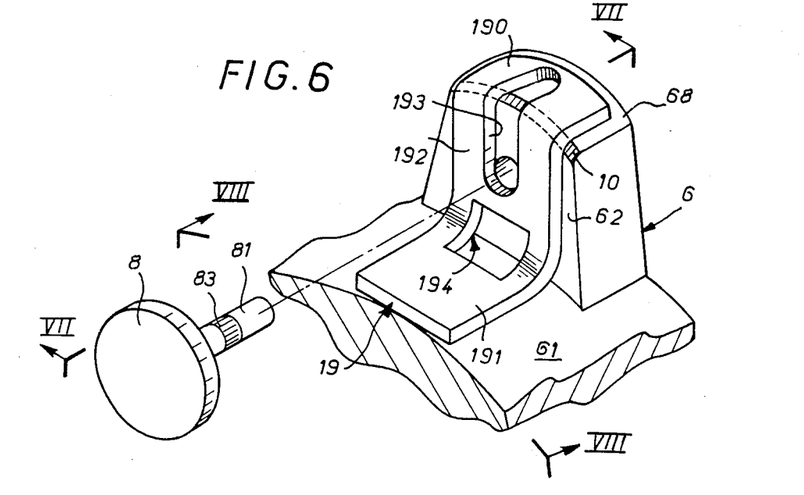
FIG. 6 is a partially exploded view in perspective of another embodiment of the radial arm in accordance with the invention.
Figure 7:
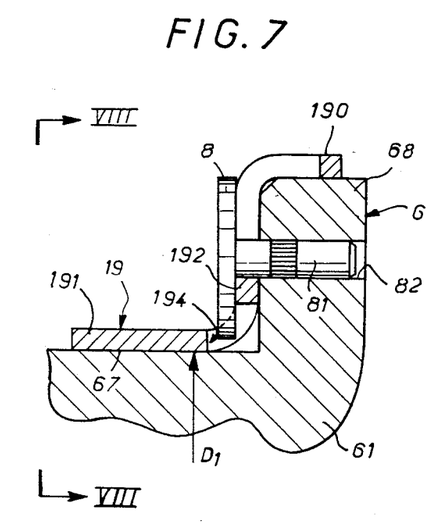
FIG. 7 is an axial cross-section through the aforementioned radial arm on the lines VII—VII in FIGS. 6 and 8.

Plate 19 comprises a slot 194 in all ways comparable with slot 94 in the aforementioned plate 9. As for transverse flange 192, it also has a hole 193 extending radially towards the outside of the clutch release bearing, adapted to permit the fitting and attachment of peg 81 and pad 8. As can be seen in FIGS. 6 and 7, however, this hole extends axially within the external flange. In the embodiment shown in FIG. 13, hole 193 is restricted to the transverse flange but does not fall outside the scope of the invention because of this.

Figure 8:
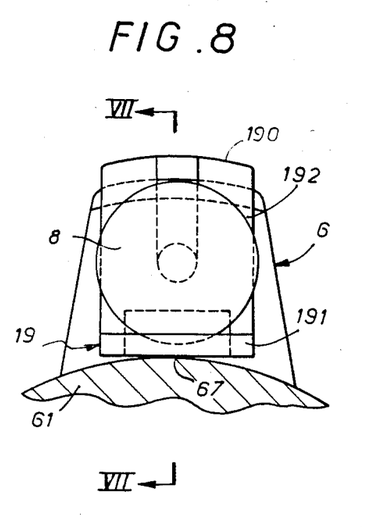
FIG. 8 is a radial cross-section through the aforementioned radial arm on the lines VIII—VIII in FIGS. 6 and 7.

The purpose of the external flange is to reinforce the contact between plate 19 and arm 6 through the intermediary of the cylindrical peripheral surface 68 of said arm which is obtained by turning about the axis Z—Z of the clutch release bearing. A chamfer 10 is with advantage formed at the junction between the cylindrical surface of arm 6 and shoulder 62, in order to permit good contact thereof with flanges 190 and 192 on either side of their junction.

The embodiment shown in FIGS. 6 to 8 no longer features stepped portion 63 since the external flange is itself sufficient to ensure satisfactory positioning of the plate. The simultaneous presence of an external flange 190 and a stepped portion 63 (as in FIG. 12) naturally improves such positioning. In the absence of any stepped portion, the function of slot 194 is reduced, as compared with the embodiment of FIGS. 3 to 5, to permitting entry of pad 8, as seen in FIG. 7. In the embodiment shown in FIG. 14 plate 19 has no slot; the pad then generally comprises a flat.

As compared with the embodiment shown in FIGS. 3 to 5, plate 19 retains vis-à-vis arm 6 and tab 61 contact line 67 and the contact surface between flange 192 and transverse shoulder 62.

FIGS. 6 to 11 show various forms of contact between outside flange 190 of plate 19 and peripheral surface 68 of radial arm 6.

FIGS. 6 to 8 illustrate the case in which external flange 190 is curved so that it mates very accurately with the aforementioned peripheral surface. No rotation of plate 19 relative to operating member 3 or peg 81 is possible, since the axis of curvature Z—Z of said peripheral surface is far beyond peg 81 and the peg cooperates as previously with the bottom of hole 193. In terms of its advantages, this embodiment is closely related to the case in which the aforementioned peripheral surface and the external flange are plane.

Figure 9:
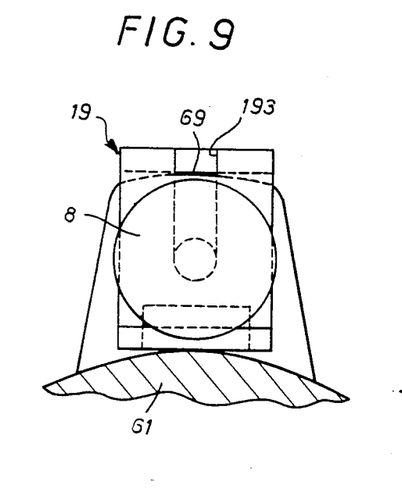
FIGS. 9 to 11 are detailed end views of the peripheral part of various embodiments of clutch release bearing in accordance with the invention.

FIG. 9 illustrates the case in which the external flange is plane and has only one line of contact 69 with peripheral surface 68 of the arm; the shaping of plate 19 is then very simple, requiring only two bends between the flanges with no other curvature.

Figure 10:
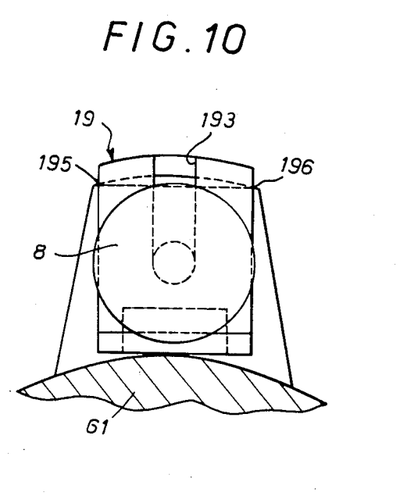

FIG. 10 illustrates the case in which the external flange is more convex than peripheral surface 68 of the arm. Plate 19 is then prevented from rotating around operating member 3 and peg 81 by virtue of the latter and sharp edges 195 and 196 which lock onto said peripheral surface.

Figure 11:
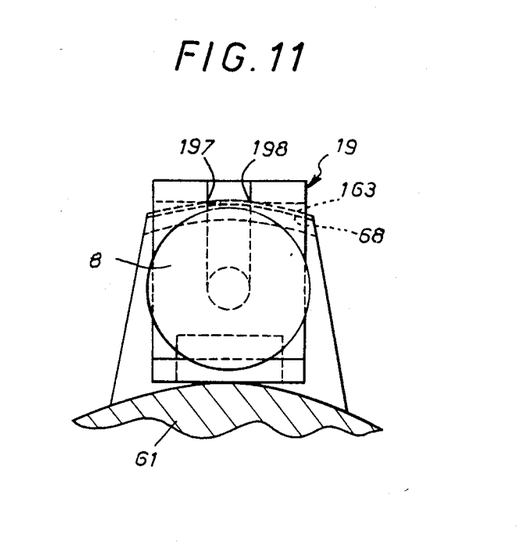
Figure 12:
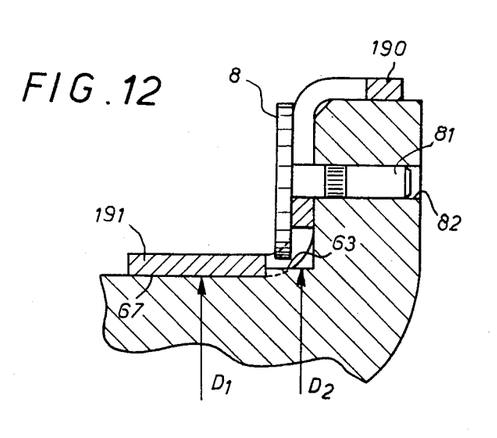
FIG. 12 is an axial cross-section through a further embodiment of clutch release bearing radial arm in accordance with the invention.
Figure 13:
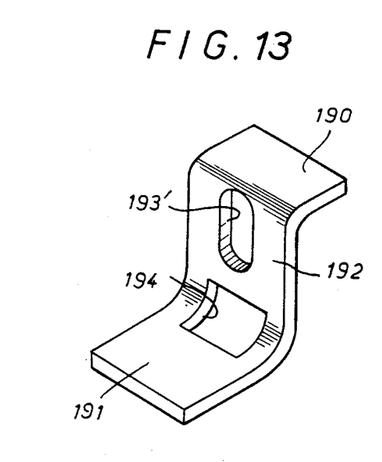
FIGS. 13 and 14 are perspective views of other embodiments of plates for radial arms in accordance with the invention.
Figure 14:
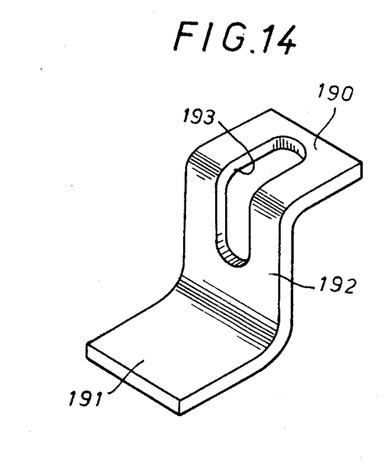

FIG. 11 illustrates the case in which the cylindrical external surface 68 of arm 6 comprises a stepped portion 163, analogous to stepped portion 63 of tab 61, on which external flange 190 bears through two sections 197 and 198 of the internal axial edges of hole 193.

Further variants of the external flange may be envisaged by those skilled in the art and as appropriate to the shape of arm 6 and its external surface 68, without departing from the scope of the invention.

Figure 15:
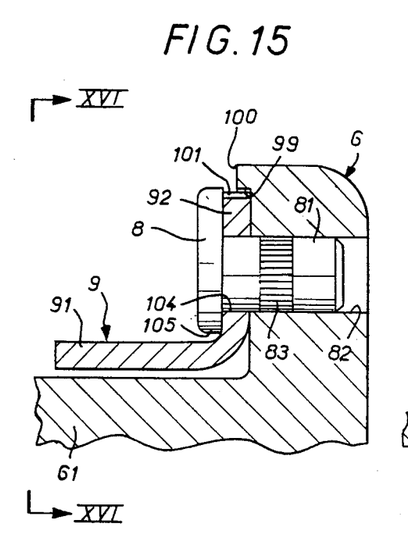
FIG. 15 is a side view in cross-section of a further embodiment.
Figure 16:
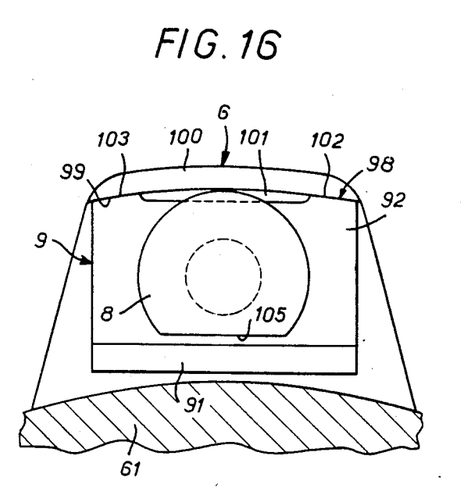
FIG. 16 is a front view of the embodiment shown in FIG. 15.

FIGS. 15 and 16 illustrate the case in which, as in FIGS. 3 to 5, plate 9 has a tangential flange 91 and a transverse flange 92, but in which the prevention of rotation of plate 9 around peg 81 and thus relative to the operating member is achieved differently. In this variant, the external peripheral edge 98 of transverse flange 92, opposite the edge of said flange 92 joining same to tangential flange 91, is cylindrical and is surrounded by the internal surface 99 of an axial projection 100 at the periphery of radial arm 6. In practice, internal surface 99 is cylindrical and is obtained by turning around axis Z—Z of the clutch release bearing, external peripheral edge 98 having a central recess 101 and mating with the profile of surface by virtue of its solid end portions 102 and 103. Note that tangential flange 91 is spaced from tab 61, contact line 67 being eliminated, which reduces the amount of machining required, that the peg passes through a circular hole 104, that pad 8 has a flat 105 and that plate 9 has no slot. In this embodiment the peg is axially engaged with no or slight clearance in circular hole 104 in the plate and then force-fitted in hole 82 to clamp plate 9. It will be appreciated that the plate is then prevented from rotating around the peg by areas 103 and 102, which are adapted to cooperate with surface 99 of projection 100, and peg 81 engaged in hole 104.

Figure 17:
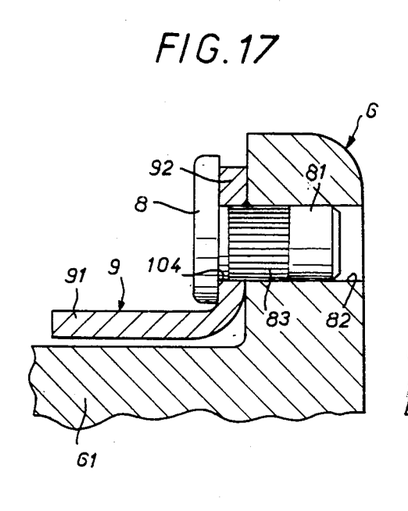
FIG. 17 is a side view in cross-section of a variant of the embodiment shown in FIGS. 15 and 16.

FIG. 17 shows an embodiment analogous to that of FIGS. 15 and 16, except that in this variant arm 6 has no projection 100 and prevention of rotation of plate 9 is achieved by the peg itself. To this end, the peg 81 is force-fitted into circular hole 104, with splines 83, in practice knurling, cooperating after fitting with the contour of hole 104 to prevent rotation of the plate and also with hole 82.

Figure 18:
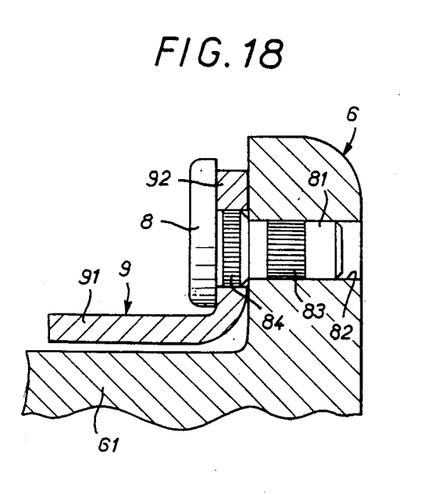
FIG. 18 is a side view in cross-section of a modified variant of the embodiment shown in FIGS. 15 and 16.

FIG. 18 shows an improvement to the preceding embodiment in which the peg has two separate knurled areas 83 and 84, area 83 preventing rotation of the peg relative to the arm and area 84 preventing rotation of plate 9 relative to the peg and thus relative to operating member 3. Note that the diameter of knurled area 84 is greater than that of knurled area 83 and thus that metal particles pared from flange 92 represent no risk of disrupting fitting of the peg into the hole.

It will be understood that various changes in the details, materials and arrangement of parts, which have been herein described and illustrated in order to explain the nature of the invention, may be made by those skilled in the art within the principle and scope of the invention as expressed in the appended claims.

The invention is applicable to all types of clutch release bearing, in particular the "push" type, provided that the operating member comprises at least one radial arm projecting from a cylindrical body portion on which a control member bears. The full benefit of the invention is obtained when the clutch release bearing is obtained by casting followed by turning. The pad may be circular or otherwise, and integral with the peg or not. The plate forming the complementary support surface may have any combination of the characteristics defined hereinabove, with two or three flanges and with or without slot, whatever the shape of the hole adapted to permit the peg to pass through it, and whatever the nature of the resulting points, lines or areas of contact.

I claim:

1. A clutch released bearing which comprises a drive member which is adapted to operate a clutch release device in a clutch, an operating member which is adapted to be operated by a control member, wherein said drive member and said operating member are coupled together in the axial direction but free to rotate relative to one another, a radial arm on said operating member, a transverse shoulder on said radial arm, a pad on said radial arm which is adapted to constitute an axial support for said control member, a peg adapted to couple said pad to said arm in the axial direction, a plate, a tangential flange on said plate which is adapted to constitute a radial support for said control member, a transverse flange on said plate which is perpendicular to said tangential flange and which is disposed between and adapted to be clamped between said pad and said transverse shoulder on said arm, and a hole in said tangential flange which is adapted to permit said peg to pass through it.

2. A clutch release bearing according to claim 1, wherein said hole is open-ended radially outward of said transverse flange.

3. A clutch release bearing according to claim 1, wherein said radial arm has a cylindrical peripheral surface which is coaxial with the bearing and said plate further comprises an external flange which is axially oriented in the opposite sense to said tangential flange and which is joined to said transverse flange at an edge of said transverse flange opposite the edge of said transverse flange at which said transverse flange is joined to said tangential flange.

4. A clutch release bearing according to claim 3, wherein said hole extends radially within said transverse flange and axially within said external flange.

5. A clutch release bearing according to claim 3, wherein said external flange is plane and contacts said peripheral surface of said radial arm along an axial line.

6. A clutch release bearing according to claim 3, wherein said external flange is convex towards the outside of the bearing and contacts said peripheral surface of said radial arm over an area.

7. A clutch release bearing according to claim 3, wherein said external flange is convex towards the outside of the bearing and contacts said radial arm along two axial edges.

8. A clutch release bearing according to claim 4, wherein said peripheral surface of said radial arm has, in the vicinity of said transverse shoulder, a cylindrical peripheral stepped portion which has a diameter slightly larger than that of said peripheral surface, and the axial edges of said hole bear on said stepped portion.

9. A clutch release bearing according to claim 1, wherein said plate comprises a circumferentially closed slot at the junction of said tangential and transverse flanges.

10. A clutch release bearing according to claim 9, wherein said operating member is formed with a cylindrical stepped portion at the base of said radial arm and the axial edges of said slot bear on said stepped portion.

11. A clutch release bearing according to claim 9, wherein said pad is circular and engaged within said slot.

12. A clutch release bearing according to claim 1, wherein said operating member has a cylindrical portion over which said radial arm extends and said tangential flange contacts said cylindrical portion along an axial line.

13. A clutch release bearing according to claim 1, wherein said transverse flange has an external peripheral edge and said arm has a peripheral axial projection with a cylindrical internal surface which surrounds said external peripheral edge of said transverse flange.

14. A clutch release bearing according to claim 1, wherein said peg is formed with splines and said hole in said transverse flange is circular and adapted to cooperate with said splines.

15. A clutch release bearing according to claim 1, wherein said arm is formed with an axial hole which is adapted to permit said peg to pass through it, said transverse flange is formed with a circular hole which has a diameter greater than that of said axial hole, and said peg further comprises two knurled areas of different sizes which cooperate with said axial hole and said circular hole.

* * * * *